No. 618,750. Patented Jan. 31, 1899.
J. TORROELLA.
MACHINE FOR CLEANING HEMP.
(Application filed Feb. 11, 1898.)
(No Model.) 2 Sheets—Sheet 1.

WITNESSES:
Edw. Thorpe

INVENTOR
J. Torroella
BY
ATTORNEYS.

No. 618,750. Patented Jan. 31, 1899.
J. TORROELLA.
MACHINE FOR CLEANING HEMP.
(Application filed Feb. 11, 1898.)
(No Model.) 2 Sheets—Sheet 2.

WITNESSES:
Edward Thorpe
Fred Acker

INVENTOR
J. Torroella
BY Munn & Co
ATTORNEYS.

UNITED STATES PATENT OFFICE.

JOSÉ TORROELLA, OF MERIDA, MEXICO.

MACHINE FOR CLEANING HEMP.

SPECIFICATION forming part of Letters Patent No. 618,750, dated January 31, 1899.

Application filed February 11, 1898. Serial No. 669,937. (No model.)

*To all whom it may concern:*

Be it known that I, JOSÉ TORROELLA, of Merida, Yucatan, in the Republic of Mexico, have invented a new and Improved Machine for Cleaning Hemp or other Fibers, of which the following is a full, clear, and exact description.

The object of the invention is to provide a machine for cleaning hemp and other fiber so constructed that there will be a total absence of chains, pressure-bars, and springs employed in other existing machines to hold the hemp or other leaves while they are being led to, cleaned by, and taken away from the revolving knives, revolving disks, placed at angles to one another, being used for the purpose of holding the leaves during the process of cleaning.

A further object of the invention is to so shape the knives upon the scraping or scutching wheel that the quantity of cut fiber found in the bagasse will be reduced to a minimum.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 3:
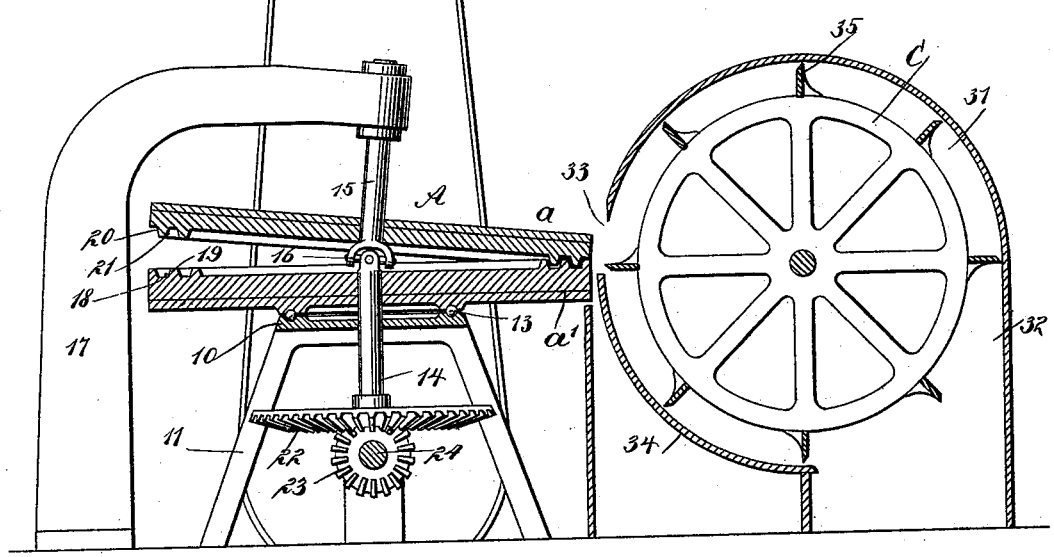
Figure 4:
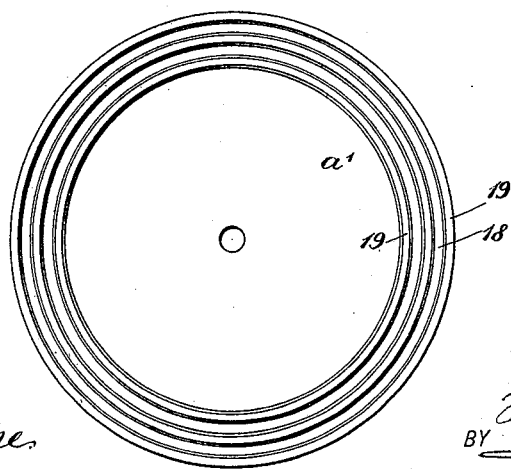

Figure 1 is a side elevation of a plant, illustrating the application of my improvement thereto. Fig. 2 is a plan view of the plant, the driving-shaft having been removed. Fig. 3 is a longitudinal vertical section through the plant, and Fig. 4 is a plan view of the lower disk of a pair.

Instead of the usual chains, pressure-bars, and springs being employed as clamps or carriers for the leaves I employ two or more pairs of disks, the pairs of disks being designated, respectively, as A and B. Each pair of disks comprises a lower horizontal disk and an upper disk placed at an angle to the lower disk, as shown particularly in Fig. 3, the disks of one pair being designated as $a$ and $a'$ and the disks of the second pair as $b$ and $b'$. The lower disks of the pairs are mounted to turn on tables 10, provided with suitable legs 11, the tables having roller-bearings 13, as shown in Fig. 3.

Each lower disk is provided with an attached shaft 14, and each upper disk is provided with an attached shaft 15, the two shafts of each pair of disks being connected by a universal joint 16. The upper disk of each pair is held in an inclined position with regard to the lower disk by means of standing brackets or supports 17. Each pair of disks is driven at the same speed, the speed being slow; but the pair of disks B turns in an opposite direction to the pair A, as indicated by the arrows in Fig. 2. The upper surface of each lower disk is provided with circular grooves 18, alternating with circular tongues 19, as shown best in Fig. 4, the tongues and grooves being near the edge of the disk, and the under face of each upper disk is provided with circular tongues 20, adapted to enter the grooves in the lower disk, and grooves 21, receiving the tongues of the lower disk.

A beveled gear 22 is secured to the lower end of each shaft 14, and the said gears mesh with pinions 23, carried by a line-shaft 24 and driven from a suitable power-shaft 25. Adjacent to the pair of disks A and opposite the wide space between the disks a feed-table 26 is erected. (Shown as provided with conveyers 27, driven by shaft 28, provided with wheel 29, which meshes with pinion 30 on the line-shaft 24.)

At the point of tangency of the disks a rapidly-revolving scraping or scutching wheel C is mounted to revolve in a circular casing 31, the casing being of greater diameter than the wheel, and the casing is provided with an outlet 32 near its bottom and with a transverse opening 33, which faces the point of contact between the opposing disks of a pair, one of the said scraping-wheels being provided for each pair of disks. The scraping-wheel is provided with a series of transversely-arranged blades 35, and each blade is provided with an upper beveled surface, the beveled surfaces of the blades being the surfaces that are to be brought in engagement with the leaves, and the leaves while being cleaned will rest upon the segmental bottom 34, which extends from the transverse opening 33 of the casing to the outlet 32.

The disposition of the cleaning-knives is a novel one, as instead of presenting an acute angle to the leaves, as in all other machines, the scraping-knives are brought in contact with the leaves in an exactly-reversed way and in such a manner that the beveled edges of the knives are their cleaning edges. It is claimed this disposition of the knives will greatly diminish the quantity of cut fiber found in all bagasse.

The leaves are placed transversely upon the feed-table, their butts facing the open space between the disks of the first pair A. The leaves are fed by hand from the feed-table into the space between the disks $a$ and $a'$, the butt-end entering the said space, and as the disks $a$ and $a'$ are revolving at a low rate of speed in the direction of the arrow shown in Fig. 2 the leaves fed to the disks are caught at or near the point $x$, and the butts of the leaves being held firmly between the two disks $a$ and $a'$ said leaves are carried to the opening 33 in the casing of the scraping-wheel belonging to the set of disks A. As soon as the knives come in contact with the leaves the leaves are whipped downward into the casing and made to lie upon the bottom 34, where the knives act upon the leaves in such manner as to thoroughly clean and expose the fiber. As the disks $a$ and $a'$ continue to revolve the stripped or cleaned fiber is drawn out from the casing of the scraping-wheel and will hang pendent in like manner as a fringe over the guide-bar 36, which extends from a support adjacent to the wheel-casing to the space between the disks $b$ and $b'$. At or about the time that the fiber is gripped and held between the disks $b$ and $b'$ the butts of the leaves will have been released from the disks $a$ and $a'$, and the disks $b$ and $b'$, holding fast the fiber, will direct the butts and inclined ends of the leaves into the casing of the second scraping-wheel, where the butt-ends of the leaves will also be cleaned. When the cleaned fiber now held by the disks $b$ and $b'$ reaches the point $x'$, the fiber will be freed from the disks $b$ and $b'$ and may be taken away to the drier.

Having thus described my invention, I claim as new and desire to secure by Letters Patent—

1. In a machine for cleaning hemp and other fiber, a gripping and carrying device for the leaves, consisting of opposing disks having contact with each other at a predetermined point in their circumference, and means for scutching as specified.

2. In a machine for cleaning hemp and other fiber, a gripping and carrying device for the leaves, consisting of disks arranged at an angle to each other, a portion of the peripheral surfaces of the disks being in contact, means for driving the disks, and means for scutching for the purpose set forth.

3. In a machine for cleaning hemp and other fiber, a gripping and carrying device for the leaves, consisting of an upper and a lower disk placed at angles to each other, the opposing faces of the disks being provided with circular grooves and ribs, the ribs of one disk entering the grooves of the opposing disk at predetermined portions of their peripheries, and means for scutching as described.

4. In a machine for cleaning hemp and other fibers, the combination of two sets of gripping and carrying devices, arranged horizontally side by side and each consisting of two disks placed at an acute angle to each other and engaging at one point near their peripheries, a scraping or scutching wheel and casing therefor placed opposite such point of contact of one set of disks, and the guide-bar extending from the casing at a point adjacent to the wheel therein to the space between the other set of disks, and means for rotating the disks and wheel, as shown and described.

5. In a machine for cleaning hemp and other fibers, the combination with a scraping-wheel, of two disks arranged at an acute angle, one over the other and working in contact at one point only, independent shafts for said disks having a universal joint or connection between the latter, and one of said shafts arranged at an angle to the other, and means for rotating said shafts and wheel, as shown and described.

JOSÉ TORROELLA.

Witnesses:
JOHN WADDLE,
CHARLES A. STRUTT.